United States Patent
Tseng

(10) Patent No.: US 7,570,250 B2
(45) Date of Patent: Aug. 4, 2009

(54) CONTROL DEVICE INCLUDING A BALL THAT STORES DATA

(76) Inventor: Yi-Ming Tseng, P.O. Box 19428, Stanford, CA (US) 94309

(*) Notice: Subject to any disclaimer, the term of this patent is extended or adjusted under 35 U.S.C. 154(b) by 170 days.

(21) Appl. No.: 11/681,793

(22) Filed: Mar. 5, 2007

(65) Prior Publication Data
US 2007/0260338 A1 Nov. 8, 2007

Related U.S. Application Data

(60) Provisional application No. 60/746,485, filed on May 4, 2006.

(51) Int. Cl.
G05B 19/18 (2006.01)
G06F 3/033 (2006.01)

(52) U.S. Cl. ............ 345/167; 345/162; 700/56
(58) Field of Classification Search .......... 700/56–64, 700/70; 345/162, 163, 167
See application file for complete search history.

(56) References Cited

U.S. PATENT DOCUMENTS

| | | | | |
|---|---|---|---|---|
| 4,767,121 A * | 8/1988 | Tonner | | 473/141 |
| 5,223,709 A | 6/1993 | Pettypiece | | |
| 5,298,919 A | 3/1994 | Chang | | |
| 5,652,603 A | 7/1997 | Abrams | | |
| 5,694,153 A | 12/1997 | Aoyagi et al. | | |
| 5,751,275 A | 5/1998 | Bullister | | |
| 5,761,096 A * | 6/1998 | Zakutin | | 702/149 |
| 5,774,113 A | 6/1998 | Barnes | | |
| 5,784,052 A * | 7/1998 | Keyson | | 345/167 |
| 5,854,623 A * | 12/1998 | Bullister | | 345/167 |
| 6,061,004 A * | 5/2000 | Rosenberg | | 345/167 |
| 6,064,615 A | 5/2000 | Gudesen | | |
| 6,130,664 A * | 10/2000 | Suzuki | | 345/158 |
| 6,144,370 A * | 11/2000 | Eleyan et al. | | 345/167 |
| 6,198,472 B1 | 3/2001 | Lection et al. | | |
| 6,307,539 B2 * | 10/2001 | Suzuki | | 345/167 |
| 6,417,836 B1 | 7/2002 | Kumar et al. | | |
| 6,597,347 B1 | 7/2003 | Yasutake | | |
| 7,071,914 B1 * | 7/2006 | Marks | | 345/156 |
| 2001/0017655 A1 * | 8/2001 | Arakt | | 348/211 |
| 2001/0024232 A1 * | 9/2001 | Suzuki | | 348/207 |
| 2002/0060663 A1 | 5/2002 | Wang | | |
| 2003/0128196 A1 | 7/2003 | Lapstun et al. | | |
| 2004/0052164 A1 * | 3/2004 | Smith et al. | | 369/13.05 |
| 2004/0155962 A1 * | 8/2004 | Marks | | 348/169 |
| 2004/0164956 A1 | 8/2004 | Yamaguchi et al. | | |
| 2005/0116925 A1 | 6/2005 | Gombert et al. | | |
| 2005/0259002 A1 * | 11/2005 | Erario et al. | | 342/357.07 |

(Continued)

OTHER PUBLICATIONS

Ricker, Thomas, "SatuGO: 3 megapixel camera in a ball concept . . . yeah, it's bouncy", 2006, Jan. 5th, http://www.engadget.com/2006/01/05/satugo-3-megapixel-camera-in-a-ball-concept-yeah-its-bouncy/.*

(Continued)

Primary Examiner—Charles R Kasenge

(57) ABSTRACT

A device for controlling movement of an object relative to an environment is disclosed. The device may include a ball configured to store data for determining at least an orientation of the object relative to the environment. The data may pertain to a plurality of possible orientations of the object. The device may also include a speed control unit configured to determine at least a speed of the object relative to the environment.

19 Claims, 7 Drawing Sheets

U.S. PATENT DOCUMENTS

| | | |
|---|---|---|
| 2006/0011821 A1 | 1/2006 | Pal |
| 2006/0028442 A1 | 2/2006 | Bynum et al. |
| 2006/0082546 A1 | 4/2006 | Wey |
| 2006/0092133 A1 | 5/2006 | Touma et al. |
| 2006/0134583 A1* | 6/2006 | Gonzalez de Mendoza y Kaeding .. 434/55 |
| 2006/0209019 A1* | 9/2006 | Hu ............................. 345/156 |
| 2007/0124782 A1* | 5/2007 | Hirai et al. .................. 725/105 |
| 2007/0247439 A1* | 10/2007 | Daniel et al. ................ 345/173 |

OTHER PUBLICATIONS

Logitech, Inc., Logitech Marble™ Optical Technology White Paper, Jan. 23, 2002, p. 1-6, www.logitech.com.

Shumin Zhai, User Performance in Relation to 3D Input Device Design, Computer Graphics 32(4), Nov. 1998, pp. 50-54.

* cited by examiner

CONTROL DEVICE INCLUDING A BALL THAT STORES DATA

CROSS-REFERENCE TO RELATED APPLICATIONS/PRIORITY CLAIM

This application claims the benefit of U.S. Provisional Application No. 60/746,485 ("Control Device Comprising a Ball that Comprises Data") which was filed on 4 May, 2006 and which is incorporated herein by reference.

TECHNICAL FIELD OF THE INVENTION

One or more embodiments of the present invention relate to a control device, and more particularly, to a control device configured to control movement of an object in a three-dimensional (3-D) environment.

BACKGROUND OF THE INVENTION

Presently, control devices generally include keyboards, mouse devices, trackballs, touchpads, joysticks, game controllers, spaceballs, 3-D motion controllers, foot pedals, etc. The control devices may be used in applications such as computer operation, computer aided design (CAD), gaming, robot controls, medical examination and treatment, vehicle controls, etc.

More and more applications may require controls in a three-dimensional environment wherein controlled objects may need six or more degrees of freedom. To meet such requirements utilizing a conventional control device, a solution may involve providing additional control menu selections on a display. Disadvantageously, such menu selections may distract a user's attention from the user's main task.

Alternatively or additionally, a user may be required to operate two control devices with both hands, respectively. Such two-device arrangements may require substantial learning and practice. The two-device arrangements also may cause distraction to the user and therefore may reduce efficiency.

Still alternatively or additionally, a control device may include additional sensors or buttons to provide more degrees of freedom, such that the user may operate the control device with only one hand. Nevertheless, such arrangements with additional sensors/buttons also tend to require substantial learning or practice. Further, the additional buttons may cause extra stress and fatigue of the user's hand.

To reduce stress and fatigue of the user's hand and to enhance performance and efficiency of controls, a foot pedal may be used in conjunction with another conventional control device. Nevertheless, such an arrangement may incur unnecessary modification or duplication of control functions (such as translational controls) and costs.

SUMMARY OF THE INVENTION

One or more embodiments of the present invention relate to a device for controlling movement of an object relative to an environment. The device may include a ball configured to store data for determining at least an orientation of the object relative to the environment. The data may pertain to a plurality of possible orientations of the object. The device may also include a speed control unit configured to determine at least a speed of the object relative to the environment.

DETAILED DESCRIPTION

Figure 1:
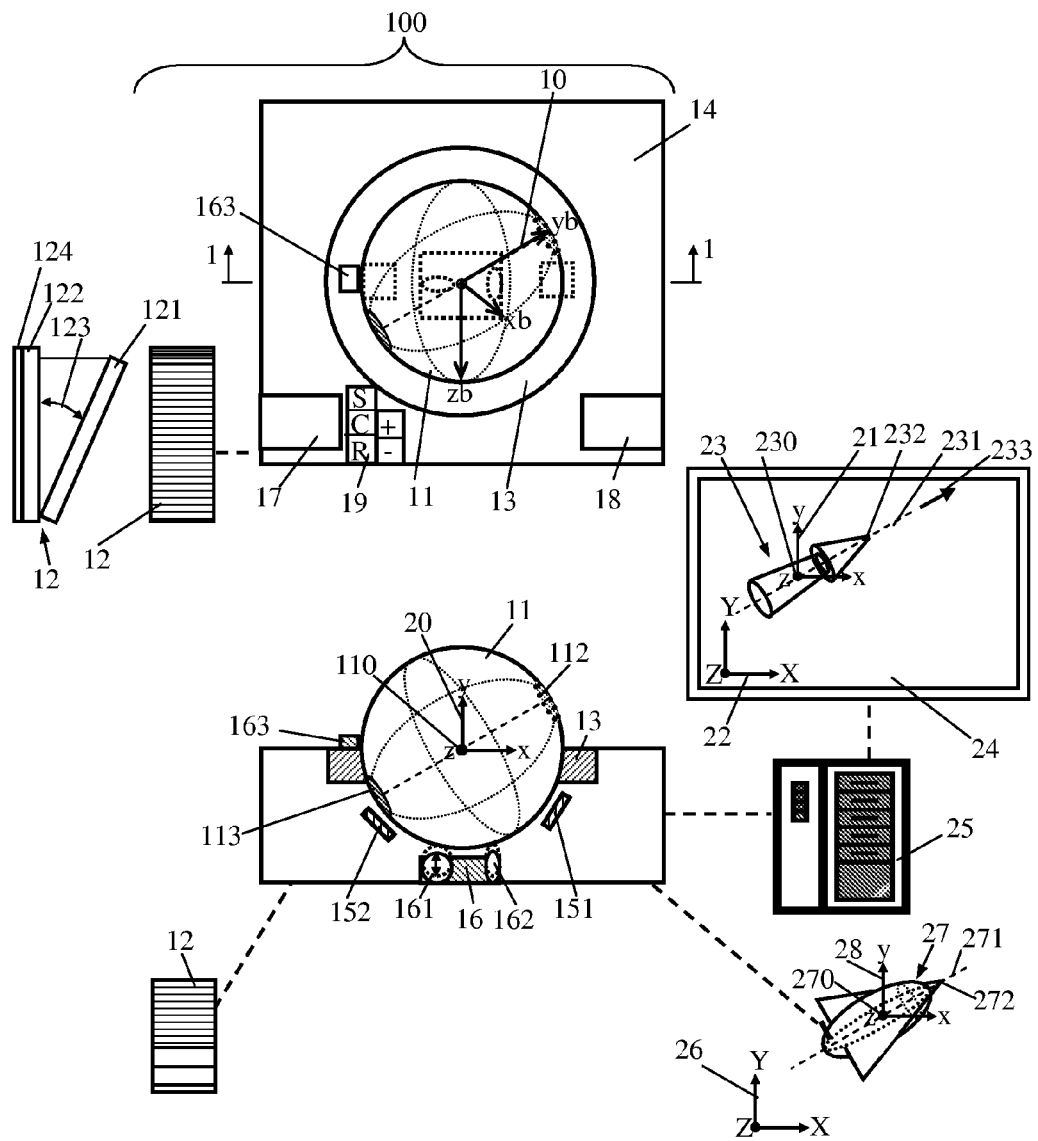
FIG. 1 illustrates a control device in accordance with one or more embodiments of the present invention.

FIG. 1 illustrates a top view and a front partial cross-sectional view of control device 100 in accordance with one or more embodiments of the present invention for controlling movement of an object, such as pointer 23 and/or vehicle 27. As illustrated in the example of FIG. 1, control device 100 may include ball 11 configured to store data for determining at least an orientation of the object relative to an environment, such as a physical environment and/or a virtual environment illustrated in display 24. The orientation may determine a translational direction of the object. Control device may further include speed control unit 12 configured to determine a speed of the object relative to the environment. In one or more embodiments, ball 11 may not cause translation of the object. In one or more embodiments, the translational direction of the movement of the object may align with an axis of the object.

In one or more embodiments, the object may include or may be part of at least one of a pointer, robot, vehicle, medical device, toy, computer-generated virtual object, etc. such as, for example and without limitation, pointer 23 or vehicle 27 illustrated in the example of FIG. 1. As illustrated in the example of FIG. 1, in one or more embodiments, control device 100 may be configured to electrically or (through radio signals) wirelessly connect to computer 25 to control movement of pointer 23 illustrated in display 24. As further illustrated in the example of FIG. 1, in one or more embodiments, control device 100 may be configured to wirelessly control movement of vehicle 27.

In one or more embodiments, a space coordinate system may be defined as a coordinate system having a stationary origin and configured to describe the position of the object. In one or more embodiments, an object coordinate system may be defined as a coordinate system configured to describe the orientation of the object; the origin of the object coordinate system may be the center of rotation of the object and may be dynamic. As illustrated in FIG. 1, space coordinate system 22 may be configured to describe the position of pointer 23 in the virtual space for movement of pointer 23; object coordinate system 21 may be configured to describe the orientation of pointer 23, and the origin of object coordinate system 21 may be pointer rotation center 230. As further illustrated in FIG. 1, space coordinate system 26 may be configured to describe the position of vehicle 27 in its space for movement; object coordinate system 28 may be configured to describe the orientation of vehicle 27, and the origin of object coordinate system 28 is vehicle rotation center 270. In one or more embodiments, x, y, and z-axes of the object coordinate system may be parallel to X, Y, and Z-axes of the space coordinate system, respectively.

In one or more embodiments, orientation/rotation control coordinate system 20 (illustrated in the example of FIG. 1) may have ball rotation center 110 as its origin, and its x, y, and z-axes may be parallel to x, y, and z-axes of the object coordinate system, respectively, and may be stationary.

In one or more embodiments, ball 11 may store data. In one or more embodiments, the data may correspond to a plurality of possible orientations of the object. In one or more embodiments, the data may be distributed at a spherical layer of ball 11 and may be readable by one or more sensors (or readers). In one or more embodiments, the data may include coordinate data of points on the surface of ball 11 according to ball coordinate system 10, which ball coordinate system 10 may have ball rotation center 110 as its origin and may rotate with ball 11. Accordingly, the orientations of xb, yb, and zb-axes may vary with respect to rotation control coordinate system 20. In one or more embodiments, the coordinate data may be located at positions of corresponding points on a spherical surface of ball 11. In one or more embodiments, the data may include normalized or scaled coordinate data. In one or more embodiments, the data may include images of symbols, e.g., numbers. In one or more embodiments, the data may be digital. In one or more embodiments, the data may be encoded in an optical storage format in physical forms such as, for example and without limitation, pits or bumps. In one or more embodiments, the data may be encoded in a magnetic storage format in physical forms such as, for example and without limitation, magnetic pulses. In one or more embodiments, the data may be encoded in one or more matrix codes (or 2D barcodes). The one or more matrix codes may represent a plurality of matrix codes. The one or more matrix codes may be printed on the surface of ball 11. For control with higher resolution, more data may be used.

FIG. 1 further illustrates a side view, a top view, and a front view of speed control unit 12 which may be configured to vary a speed of the object. In one or more embodiments, speed control unit 12 may be electrically or wirelessly connected to housing 14 of control device 100. In one or more embodiments, speed control unit 12 may include foot pedal 121 and base 122 wherein angle 123 between foot pedal 121 and base 122 may determine the speed of the object. With speed control unit 12 controlling speed and ball 11 controlling orientation, control device 100 may be used in controlling the object in a three-dimensional environment with six degrees of freedom. In one or more embodiments, speed control unit 12 may further include hook-and-loop fastener 124 that is configured to secure speed control unit 12 onto a carpet. In one or more embodiments, speed control unit 12 may include a lever.

As further illustrated in the example of FIG. 1, in one or more embodiments, control device 100 may include sensor unit 151 configured to read data and/or detect changes in images of speckles on ball 11. In one or more embodiments, sensor unit 151 may include one or more optical sensors and/or one or more light emitting diodes (LEDs) or laser light sources and may be available from suppliers such as, for example and without limitation, Agilent (www.agilent.com). In one or more embodiments, sensor unit 151 may include one or more magnetic read heads and may be available from suppliers such as, for example and without limitation, Hitachi Global Storage Technologies (www.hitachigst.com). In one or more embodiments, sensor unit 151 may include one or more image sensors.

In one or more embodiments, control device may further include additional sensor unit 152 configured to read data and/or detect changes in images of speckles on ball 11. Additional sensor units such as additional sensor unit 152 may enable control device 100 to feed more data to the processing unit of computer 25 or the processing unit in vehicle 27 to achieve more accurate control, and to prevent errors caused by contamination/damage to ball 11, insufficient data in a reading, loss of data on ball 11, and/or manufacturing constraints of ball 11. For example, ball 11 may include two interconnected hemispheres and may have insufficient data at the seam or junction of the hemispheres. If one or more sensor units do not acquire correct data, one or more of the other one or more sensor units may still acquire enough correct data to be processed for an accurate control. In one or more embodiments, control device 100 may include a processing unit for processing readings by the sensor units.

In one or more embodiments, the hemispheres may be manufactured using inject molding. In one or more embodiments, data may be encoded from the inside of each of the hemispheres, and each of the hemispheres has a transparent outside layer such that the data are protected and readable from outside of ball 11.

As further illustrated in the example of FIG. 1, control device 100 may further include bearing assembly 13 configured to support and smooth rotation of ball 11. In one or more embodiments, bearing assembly 13 includes a ball bearing or roller bearing that is well known to one of ordinary skill in the art. As illustrated in the example of FIG. 1, bearing assembly 13 is installed on housing 14 of control device 100.

Further, as illustrated in the example of FIG. 1, in one or more embodiments, control device 100 may include alignment mechanism 16 configured to rotate ball 11 to cause an axis of the object such as, for example and without limitation, pointer axis 231 or vehicle axis 271 to be parallel to an X, Y, or Z-axis of the space coordinate system (such as 22 or 26) when the axis of the object is approximately parallel to the X, Y, or Z axis. As a result, the axis of the object (such as pointer axis 231 or vehicle axis 271) may align with an axis of its object coordinate system (such as 21 or 28). In one or more embodiments, alignment mechanism may be turned on and turned off. In one or more embodiments, alignment mechanism 16 may include an electromagnetic mechanism configured to provide a magnetic force. In one or more embodiments, alignment mechanism 16 may include a roller mechanism wherein rollers 161 and 162 with different orientations are configured to engage ball 11 and rotate ball 11 for alignment.

Further, as illustrated in the example of FIG. 1, in one or more embodiments, control device 100 may include feedback mechanism 163 which is configured to provide a haptic feedback when an axis of the object is parallel to an X, Y, or Z-axis of the space coordinate system (such as 22 or 28).

Further, as illustrated in the example of FIG. 1, in one or more embodiments, control device 100 may include cruise control mechanism 19 configured to maintain the speed of the object at a certain level (while the direction of movement is controlled by ball 11). In one or more embodiments, cruise control mechanism 19 may include functions such as one or more of set, cancel, resume, accelerate, coast, etc. that are available in automobiles.

Further, as illustrated in the example of FIG. 1, in one or more embodiments, ball 11 may include tip mark 112 which corresponds to a tip of the object such as, for example and without limitation, pointer tip 232 and/or vehicle tip 272 and may provide an additional reference for the user. In one or more embodiments, tip mark 112 may include a tactile feature such as, for example and without limitation, a concave feature. Further, as illustrated in the example of FIG. 1, in one or more embodiments, ball 11 may include tail mark 113 which may correspond to a tail of the object and may provide an additional reference when tip mark 112 is not exposed.

Further, as illustrated in the example of FIG. 1, in one or more embodiments, control device 100 may include left button 17 and right button 18 configured to provide left button and right button functions of conventional pointing/control devices.

Figure 2A:
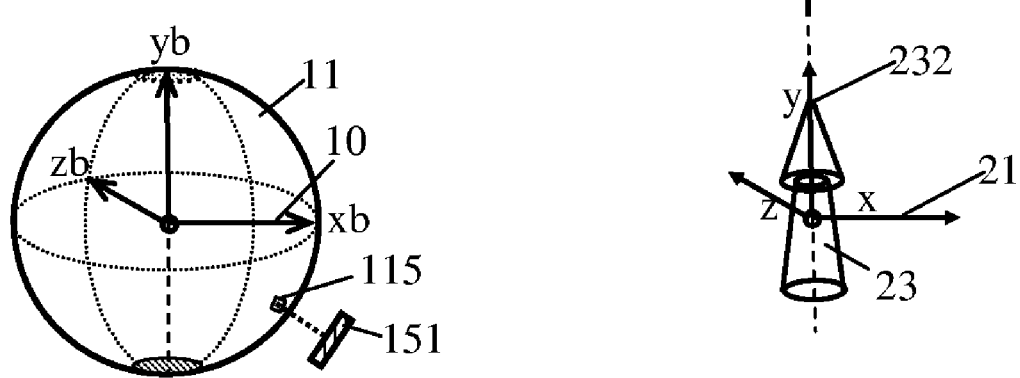
FIGS. 2A and 2B illustrate a ball of a control device in accordance with one or more embodiments of the present invention.
Figure 2B:
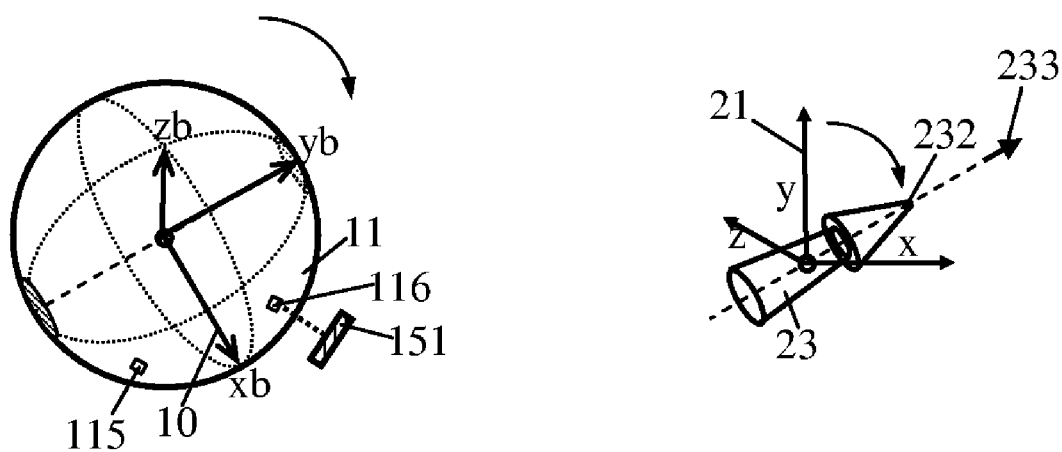

FIGS. 2A and 2B illustrate ball 11 of control device 100 (illustrated in the example of FIG. 1) in accordance with one or more embodiments of the present invention and illustrate control of rotation of pointer 23.

In one or more embodiments, ball 11 may include data that correspond to various orientations of pointer 23; the data may be distributed on a layer of ball 11 and may be readable by sensor unit 151. In FIG. 2A, when ball 11 is in a first orientation, sensor unit 151 may read in data 115 from ball 11, and control device 100 (illustrated in the example of FIG. 1) may transmit data 115 (and/or data read by one or more other sensor units, such as sensor unit 152 shown in FIG. 1) to computer 25 (illustrated in the example of FIG. 1) through an electrical or wireless connection. In response, computer 25 (which may run software compatible with control device 100) may construct the image pointer 23 in a first orientation illustrated in the example of FIG. 2A that corresponds to data 115. In FIG. 2B, when ball 11 is rotated from its first orientation illustrated in the example of FIG. 2A into a second orientation, sensor unit 151 may read in data 116 (which is different from data 115, which has been relocated and not read by sensor unit 151) from ball 11, and control device 100 (illustrated in the example of FIG. 1) may transmit data 116 (and/or data read by one or more other sensor units, such as sensor unit 152 shown in FIG. 1) to computer 25 (illustrated in the example of FIG. 1). In response, computer 25 may reconstruct the image of pointer 23 in a second orientation illustrated in the example of FIG. 2B that corresponds to data 116. According, the rotation rate and rotation amount of pointer 23 are controlled by the rotation rate and rotation amount of ball 11. Further, a high sample rate of sensor unit 151 (and/or one or more other sensor units) may provide a smooth rotation of pointer 23.

In one or more embodiments, ball 11 may include coordinate data of points on a spherical layer of ball 11 at respective positions of the points. The coordinate data may be according to ball coordinate system 10 and may be normalized or scaled. Further, points of pointer 23 may have respective corresponding points in ball 11; the corresponding points in ball 11 may have coordinate data according to ball coordinate system 10, and the coordinate data may be used by computer 25 (illustrated in the example of FIG. 1) in reconstructing the image of pointer 23 following rotation of ball 11.

In the example of FIG. 2A, when ball 11 is in a first orientation, sensor unit 151 may read in coordinate data 115 from ball 11, and control device 100 (illustrated in the example of FIG. 1) may transmit coordinate data 115 to computer 25 (illustrated in the example of FIG. 1) through an electrical or wireless connection. Based on coordinate data 115, computer 25 may calculate a vector that defines the position of pointer tip 232 as well as other vectors for other points of pointer 23 in object coordinate system 21, and accordingly constructs the image of pointer 23 as illustrated in the example of FIG. 2A. In FIG. 2B, when ball 11 is rotated from its first orientation illustrated in the example of FIG. 2A into a second orientation, sensor unit 151 may read in coordinate data 116 (which is different from coordinate data 115, which is currently relocated and not read by sensor unit 151), and control device 100 (illustrated in the example of FIG. 1) may transmit data 116 to computer 25 (illustrated in the example of FIG. 1). Based on coordinate 116, computer 25 may calculate vectors that define positions of points of pointer 23 (including pointer tip 232) in object coordinate system 21, and may accordingly reconstruct the image of pointer 23 in a second orientation as illustrated in the example of FIG. 2B.

Further, in one or more embodiments, the position of pointer 23 in space coordinate system 22 (which is a result of controls by ball 11 and speed control unit 12) may be used by computer 25 to determine a size of pointer 23. For example, if pointer 23 is deemed farther from the viewer/user, the size of pointer 23 may be reduced, and if pointer 23 is deemed closer to the viewer/user, the size of pointer 23 may be enlarged. As a result, user experience and/or perception in three-dimensional applications may be enhanced.

In one or more embodiments, when used in controlling two-dimensional movement, the data contained on ball 11 read by sensor unit 151 may be converted by computer 25 into both orientation and translation of pointer 23, but not only orientation as in three-dimensional applications.

In one or more embodiments, translational direction 233 (illustrated in FIGS. 1, 2A, and 2B) of pointer 23 aligns with pointer axis 231.

Figure 3:
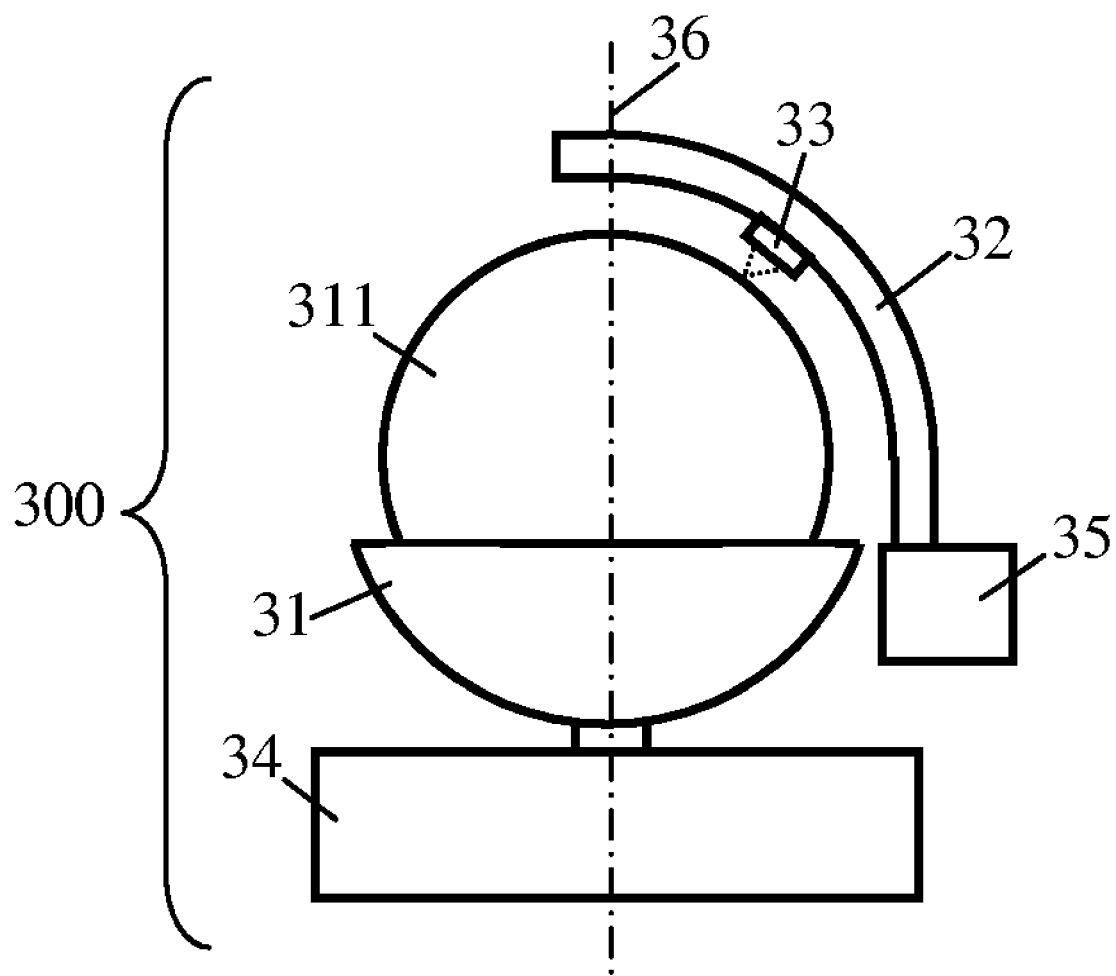
FIG. 3 illustrates a data writer in accordance with one or more embodiments of the present invention for writing data on a ball of a control device in accordance with one or more embodiments of the present invention.

FIG. 3 illustrates data writer 300 in accordance with one or more embodiments of the present invention for writing data onto a spherical medium such as, for example and without limitation, ball 311. As illustrated in the example of FIG. 3, data writer 300 may include write unit 33 configured to write the data. Data writer 300 may also include holder 31 having a receptacle feature and configured to carry ball 311 when write unit 33 writes the data. Data writer 300 may also include arc-shaped rail 32 configured to guide movement of write unit 33. Data writer 300 may also include spindle motor assembly 34 configured to rotate holder 31. Data writer 300 may also include actuator assembly 35 which is configured to move write unit 33 along arc-shaped rail 32.

In one or more embodiments, write unit 33 may include an image sensor and/or optical encoder commercially available from one or more suppliers such as, for example and without limitation, Agilent Technologies, Inc. (www.agilent.com) of Palo Alto, Calif. In one or more embodiments, write unit 33 may include a magnetic recording head commercially available from one or more suppliers such as, for example and without limitation, Hitachi Global Storage Technologies (www.hitachigst.com) of San Jose, Calif.

In one or more embodiments, arc-shaped rail 32 may be readily made by a rail manufacture. In one or more embodiments, holder 31 may include a vacuum mechanism configured to secure ball 311 in place. Holder 31 may be readily made by a vacuum cup suppler. In one or more embodiments, spindle motor assembly 34 and actuator assembly 34 may be commercially available products. In one or more embodiments, axis 36 is an axis of ball coordinate system 10 of ball 311 such as, for example and without limitation, yb-axis. In one or more embodiments, ball 311 may be coated for writing data by one or more data storage solutions companies. In one or more embodiments, the data written on ball 311 may be configured to be readable from various directions.

In one or more embodiments, a method for manufacturing a control device may include providing a ball configured to be a user interface of the control device, writing data on the ball, and providing one or more sensors for reading the data.

Figure 4A:
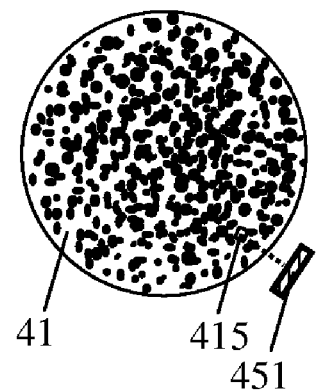
FIG. 4A illustrates a ball of a control device in accordance with one or more embodiments of the present invention.

FIG. 4A illustrates ball 41 used in a control device in accordance with one or more embodiments of the present invention. As illustrated in the example of FIG. 4, ball 41 may include speckles of random sizes or shapes. The speckles may be configured to be detected by one or more sensors such as sensor 451 for determining the rotation direction, rotation amount, and rotation rate of the object. In one or more embodiments, the rotation amount and direction may be determined based on changes of the image of speckles in area 415 that is detected by sensor 451 at different time instances.

Figure 4B:
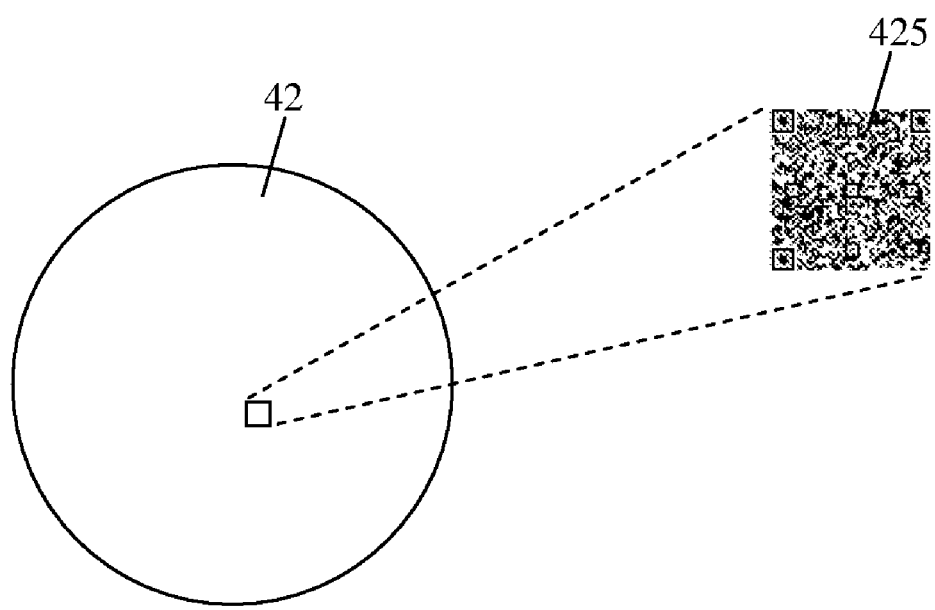
FIG. 4B illustrates a ball of a control device in accordance with one or more embodiments of the present invention.

FIG. 4B illustrates ball 42 used in a control device in accordance with one or more embodiments of the present invention. One the surface of ball 42 there may distribute matrix codes (or 2D barcodes), such as QR code 425, that contain coordinate data.

Figure 5A:
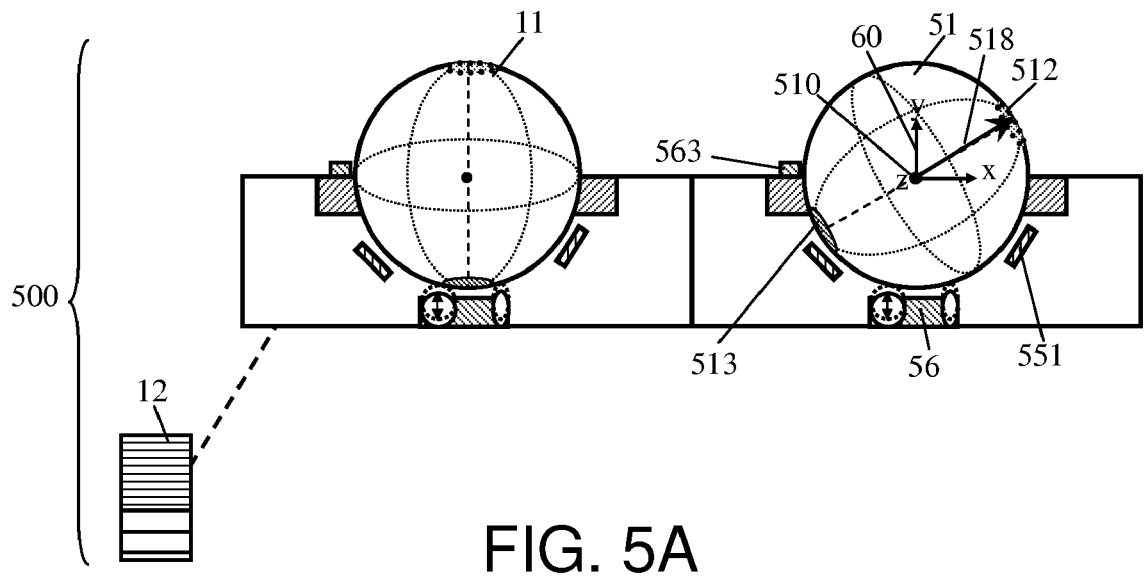
FIG. 5A illustrates a front partial cross-sectional view of a control device in accordance with one or more embodiments of the present invention.

FIG. 5A illustrates a front partial cross-sectional view of control device 500 in accordance with one or more embodiments of the present invention. As illustrated in the example of FIG. 5A, control device 500 may include ball 11 configured to cause rotation of an object. Control device 500 may also include speed control unit 12 configured to vary a speed of the object. Control device 500 may also include ball 51 configured to control a translational direction of the object. In one or more embodiments, ball 51 may include data that are configured to be read by one or more sensors such as sensor unit 551. The read data may be processed by a computer to determine coordinates of vector 518 according to direction control coordinate system 60. The coordinates may in turn be used to determine the translational direction of the object. In one or more embodiments, direction control coordinate system 60 may have ball rotation center 510 as its origin and may have stationary x, y, and z-axes.

Further, as illustrated in the example of FIG. 5A, in one or more embodiments, control device 500 may include alignment mechanism 56 configured to rotate ball 51 to align the translational direction with an axis of the object when the translational direction approximates the axis and/or align the translational direction with an x, y, or z-axis of the object coordinate system of the object when the translational direction approximates the x, y, or z-axis. In one or more embodiments, modes of alignment may be configurable, and alignment mechanism 56 may be turned on and turned off.

Further, as illustrated in the example of FIG. 5A, in one or more embodiments, control device 500 may include feedback mechanism 510 configured to provide a haptic feedback when the translational direction aligns with an axis of the object and/or when the translational direction aligns with an x, y, or z-axis of the object coordinate system of the object.

Further, as illustrated in the example of FIG. 5A, in one or more embodiments, ball 51 may include direction mark 512 configured to provide a reference of the translational direction for a user. In one or more embodiments, ball 51 further may include tail mark 513 configured to provide an additional reference.

Figure 5B:
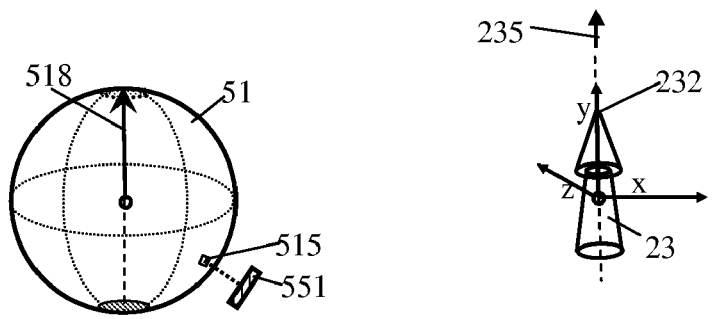
FIG. 5B illustrates a ball of the control device illustrated in the example of FIG. 5A.
Figure 5C:
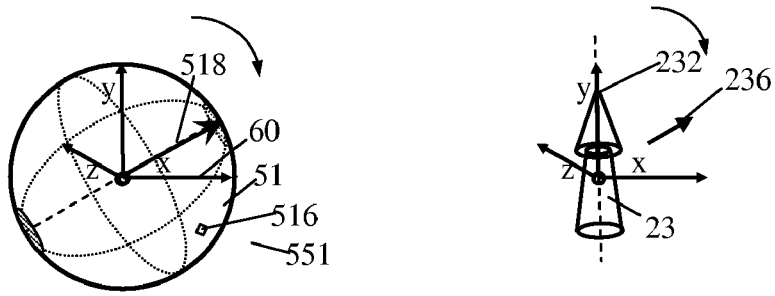
FIG. 5C illustrates a ball of the control device illustrated in the example of FIG. 5A.

FIGS. 5B and 5C illustrate ball 51 of control device 500 and illustrate control of translational direction of pointer 23, given ball 11 (illustrated in the example of FIG. 5A) is not rotated. In the example of FIG. 5B, sensor unit 551 may read data 515 from ball 51, and control device 500 may transmit data 515 to a computer. In one or more embodiments, based on data 515, the computer may determine coordinates of vector 518 in direction control coordinate system 60 (as illustrated in the example of FIG. 5C) and, based on the coordinates, the computer may determine first translational direction 235 of pointer 23. Accordingly, pointer 23 may move in first translational direction 235 at a speed controlled by speed control unit 12 (illustrated in the example of FIG. 5A). In the example of FIG. 5C, ball 51 is rotated, but ball 11 is not rotated. Sensor unit 551 may read data 516, which may be transmitted by control device 500 to the computer. The computer may in turn determine a set of new coordinates of vector 518 in direction control coordinate system 60 and, based on the new coordinates, may determine second translational direction 236. Accordingly, pointer 23 may move in second translational direction 236 at a speed controlled by speed control unit 12 (illustrated in the example of FIG. 5A). Since ball 11 is not rotated, the orientation of pointer 23 may remain unchanged.

Figure 6:
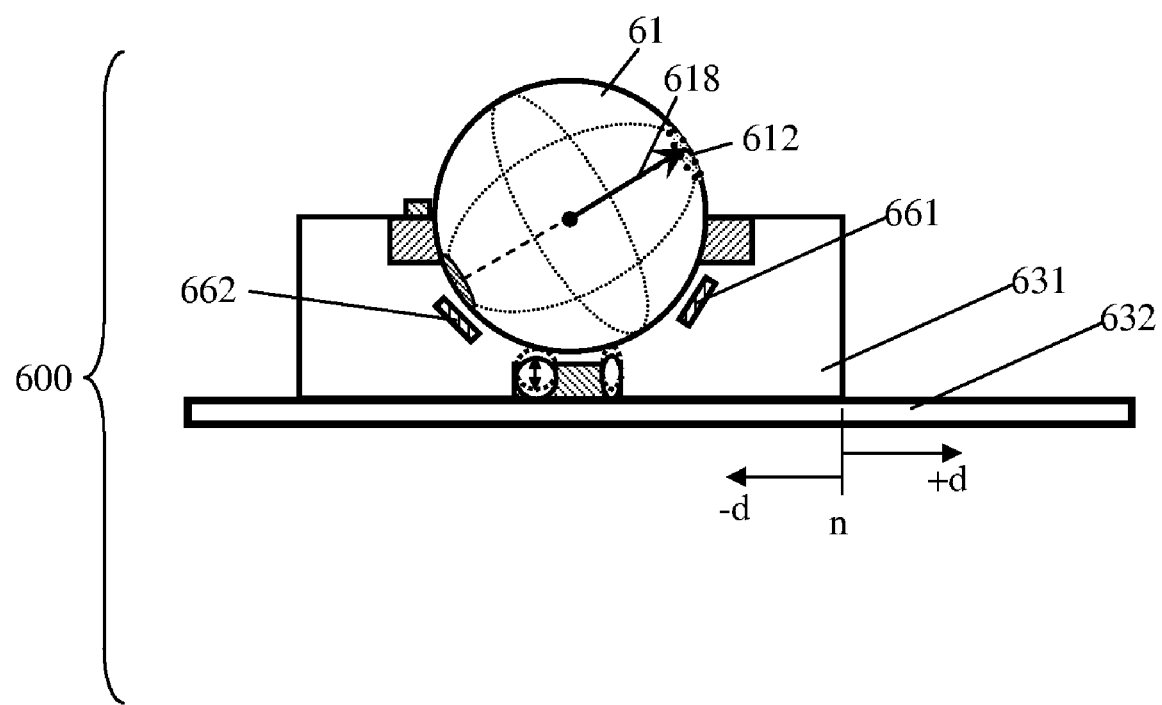
FIG. 6 illustrates a front partial cross-sectional view of a control device in accordance with one or more embodiments of the present invention.

FIG. 6 illustrates control device 600 in accordance with one or more embodiments of the present invention for controlling movement (e.g., orientation and translation) of an object relative to an environment. As illustrated in the example of FIG. 6, in one or more embodiments, control device 600 may include ball 61 configured to control the orientation of the object relative to the environment. Control device 600 may also include a speed control unit configured to vary a speed of the movement. Control device 600 may further include sensor units 661 and 662 configured to acquire (with redundancy) data from ball 61 pertaining to coordinates of vector 618 in a space coordinate system or orientation control coordinate system. The coordinates may then be used in determining the orientation of the object relative to an environment, such as a physical environment and/or a virtual environment illustrated in a computer display.

The speed control unit may include ball support 631 and base 632. Displacement +d of ball support 631 relative to base 632 may cause the object to move in a first direction according to the orientation of the object and relative to the environment. For example, the first direction may represent a forward direction, a zoom-in direction and/or a close-up direction. The amount of displacement +d may determine the speed of the object in the first direction relative to the environment. On the other hand, displacement −d of ball support 631 relative to base 632 may cause the object to move in a second direction according to the orientation of the object and relative to the environment. For example, the second direction may represent a backward direction, a zoom-out direction and/or a move-away direction. The amount of displacement −d may (be converted to) determine the speed of the object in the second direction relative to the environment. A neutral position n of ball support 631 relative to base 632 may mean no translation of the object, though the orientation of the object may be changed by rotating ball 61.

Further, as illustrated in the example of FIG. 6, in one or more embodiments, ball 61 includes direction mark 612 that is configured to provide a reference of the orientation of the object for a user.

Figure 7:
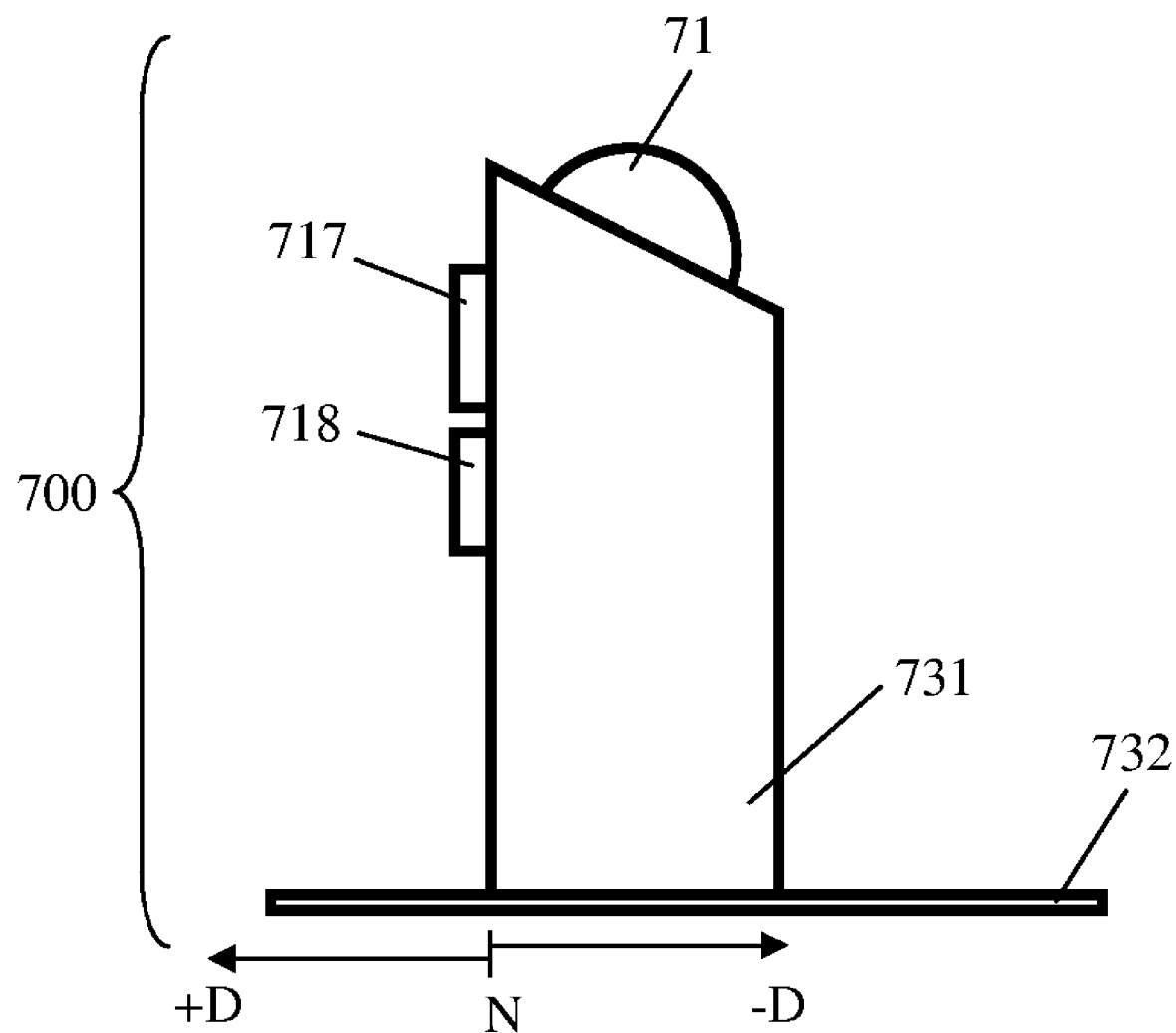
FIG. 7 illustrates a side view of a control device in accordance with one or more embodiments of the present invention.

FIG. 7 illustrates control device 700 in accordance with one or more embodiments of the present invention for controlling movement (e.g., orientation and translation) of an object relative to an environment. Similar to control device 600 illustrated in the example of FIG. 6, control device may include ball 71 for controlling the orientation of the object relative to the environment and a speed control unit including handle 731 and base 732 for controlling the speed of the object relative to the environment. Displacements +D and −D of handle 731 relative to base 732 may be converted to the relative speed of the object in the first and second directions, respectively. Neutral position N may mean no relative translation of the object. Handel 732 may be configured to support ball 71, to house one or more sensors (not illustrated) for reading data from ball 71, and to be held by a user. Ball 71 may be operated by a thumb of the user. Control device 700 may further include one or more buttons such as buttons 717 and 718 configure to perform functions of conventional control devices such as one or more of clicking, picking, displaying menus, etc.

In this disclosure, movement of an object relative to an environment may represent movement of the object and/or movement of the environment from a user's point of view.

The embodiments of the present invention described above are exemplary. Many changes and modifications may be made to the disclosure recited above, while remaining within the scope of the invention. The scope of the invention should, therefore, be determined not with reference to the above description, but instead should be determined with reference to the appended claims along with their full scope of equivalents.

What is claimed is:

1. A device for controlling movement of an object relative to an environment, the device comprising:
    a ball that is a data storage medium, the ball storing data for determining at least an orientation of the object relative to the environment, the data pertaining to a plurality of possible orientations of the object, the data or representations of the data being distributed at at least one of a spherical layer of the ball and an outer spherical surface of the ball; one or more sensors configured to read the data or the representations of the data from the ball, wherein rotation of the ball controls rotation of the object; and
    a speed control unit configured to determine at least a speed of the object relative to the environment.

2. The device of claim 1 wherein the data or the representations of the data are distributed at the spherical layer of the ball.

3. The device of claim 1 wherein the data are encoded in at least one of a digital format, an optical storage format, and a magnetic storage format.

4. The device of claim 1 wherein the data are encoded in a plurality of matrix codes.

5. The device of claim 1 wherein the data include coordinate data of points on a spherical surface.

6. The device of claim 1 further comprising a first sensor and a second sensor configure to read the data, wherein when a first reading provided by the first sensor is not used in determining the orientation of the object, a second reading provided by the second sensor is used in determining the orientation of the object.

7. The device of claim 1 further comprising a processing unit configured to decode the data.

8. The device of claim 1 wherein the ball includes at least one of a tip mark corresponding to a tip of the object and a tail mark corresponding to a tail of the object.

9. The device of claim 1 wherein the speed control unit includes a first part and a second part, wherein a displacement of the first part relative to the second part is converted to the speed of the object and a translation direction of the object relative to the environment.

10. The device of claim 1 wherein the speed control unit includes at least one of a foot pedal, a button, a lever, and a hook-and-loop fastener.

11. The device of claim 1 further comprising a cruise control mechanism configured to maintain the speed of the object at a certain level.

12. The device of claim 1 further comprising an alignment mechanism configured to rotate the ball to cause an axis of the object to be parallel to an X, Y, or Z-axis of a reference coordinate system.

13. The device of claim 12 wherein the alignment mechanism comprises at least one of an electromagnetic mechanism and a roller mechanism.

14. The device of claim 1 further comprising a feedback mechanism configured to provide a haptic feedback when an axis of the object is parallel to an X, Y, or Z-axis of a reference coordinate system.

15. The device of claim 1 wherein the object represents at least a portion of at least one of a pointer, a robot, a vehicle, a medical device, a toy, and a computer-generated virtual object.

16. The device of claim 1 wherein the ball does not cause translation of the object.

17. The device of claim 1 wherein an axis of the object aligns with the translational direction.

18. The device of claim 1 further comprising one or more buttons configured to provide one or more of click, select, menu functions in operating a computing device.

19. The device of claim 1 wherein the speed control unit comprises a reverse function configured to reverse a direction of the movement of the object.

* * * * *